(No Model.)

A. L. HENRY.
SIFTER.

No. 311,896. Patented Feb. 10, 1885.

WITNESSES.
Chas. N. Leonard.
E. W. Bradford.

INVENTOR.
Andrew L. Henry,
PER
C. Bradford,
ATTORNEY.

N. PETERS. Photo-Lithographer, Washington, D. C.

UNITED STATES PATENT OFFICE.

ANDREW L. HENRY, OF LADOGA, INDIANA.

SIFTER.

SPECIFICATION forming part of Letters Patent No. 311,896, dated February 10, 1885.

Application filed October 13, 1884. (No model.)

*To all whom it may concern:*

Be it known that I, ANDREW L. HENRY, of the town of Ladoga, county of Montgomery, and State of Indiana, have invented certain new and useful Improvements in Sifters, of which the following is a specification.

My said invention consists in certain improvements in sifters whereby a very convenient and inexpensive sifter is produced, as will be hereinafter more fully described and claimed.

Figure 1:
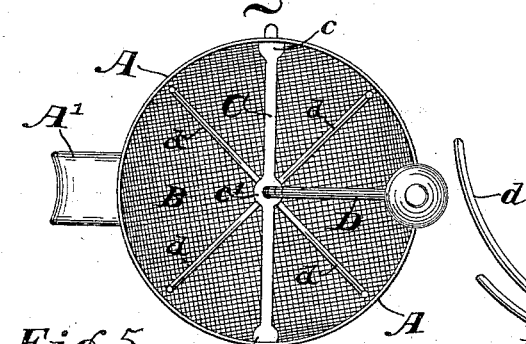
Figure 4:
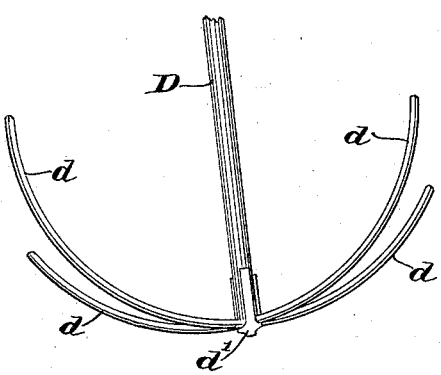
Figure 5:
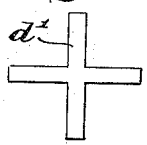
Figure 2:
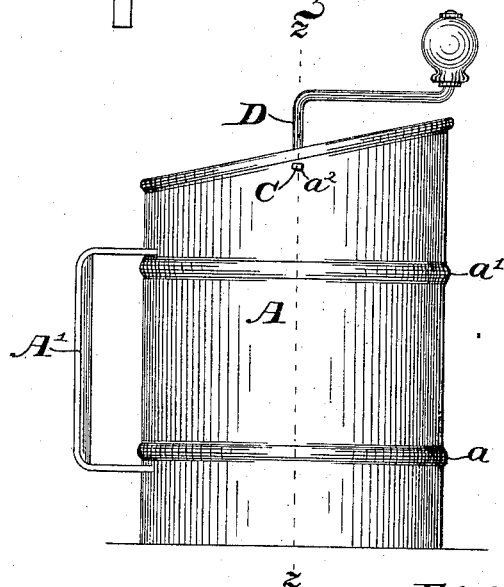
Figure 3:
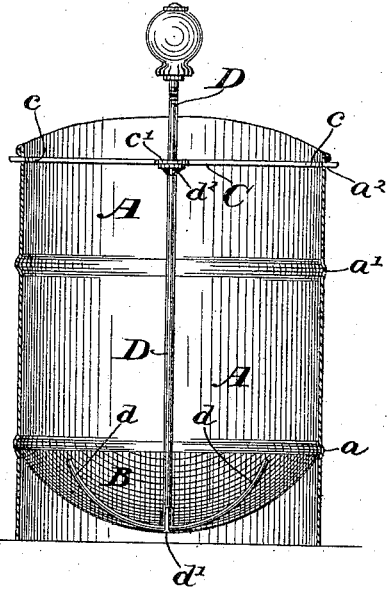
Figure 6:
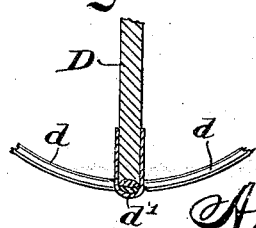

Referring to the accompanying drawings, which are made a part hereof, and on which similar letters of reference indicate similar parts, Figure 1 is a top or plan view of my improved sifter; Fig. 2, a side elevation of the same; Fig. 3, a central vertical section on the dotted line $z\ z$; Fig. 4, a perspective view of the lower end of the agitator; Fig. 5, a plan of the piece by which the arms of said agitator are fastened to its stem, and Fig. 6 a detail sectional view through the lower end of the agitator.

In said drawings, the portions marked A represent the body or casing of the sifter; B, the sieve; C, the cross-bar in which the agitator-shaft is journaled, and D the agitator. The casing A is cylindrical in form, and of the appropriate size for convenience. It is provided with a suitable handle, A', as is usual, and one or more grooves, $a\ a'$, in one of which the sieve may be fastened, while the others may serve to indicate the quantity of flour in the sifter. In opposite sides, near its top, it is provided with mortise-like holes $a^2$, for the reception of the ends of the cross-bar C, as shown. The sieve B is formed with its inside surface concave, or substantially hemispherical, and is soldered at its edges to the body or casing A, preferably in the groove $a$, formed around the lower part of said casing, as shown. The cross-bar C is formed from a flat piece of metal possessing the quality of elasticity, and extends across the casing near its top, the ends entering the rectangular holes $a^2$, formed therein to receive them. Near each end enlarged portions $c$ are formed on the sides of the bar, which bear against the walls of the casing, thus holding said bar in proper position. The ends of the bar being rectangular and adapted to fit the holes, a steady and rigid bearing is formed, preventing any play while the agitator is being operated. The central portion, $c'$, is enlarged, and a hole is provided therein in which the upper end of the agitator-shaft is journaled, as shown. The bar is formed of sufficient width to give a firm and rigid bearing and prevent any lateral spring or sidewise movement; but it is preferably formed of only such thickness as is required to give it the necessary strength, and is thus enabled to spring vertically, which operates to adjust the agitator and keep it in proper relation to the sieve; and also gives elasticity to its motion and permits any hard substance to pass underneath the agitator that may chance to be in the material being sifted. The body of the sifter, being somewhat elastic, is capable of being compressed sufficiently to permit this bar to be inserted and removed, and said bar is preferably made long enough to distend said body slightly when it is in position, and thus said body at all times holds said bar securely and prevents any play or vibration thereof. The agitator D consists of a vertical shaft and wires $d$ extending out radially from its lower end, said wires being bent to conform substantially to the concave shape of the sieve. They are usually four in number, (or two crossed,) and are of a length to extend out nearly to the edge of the sieve. They are preferably secured to the end of the vertical shaft by crossing them in their centers upon said end, and securing them in position by a +-shaped piece of tin or light metal, $d'$, (see Fig. 5), and bending one arm of said piece up between each pair of wires against the sides of the shaft and soldering the several parts firmly together in this position. (See Figs. 4 and 6.) The upper end of the vertical shaft is passed through the hole in the enlarged central portion, $c'$, of the cross-bar, and is formed into a crank by which the agitator is turned. An enlargement or ring, $d^2$, is formed upon the agitator-shaft just below where it passes through the cross-bar, which, being elastic, imparts the required degree of elasticity to the agitator, as before described. The parts of the agitator are placed in and removed from their operative positions by simply compressing the casing slightly upon the sides opposite those in which the ends of the cross-bar are mounted, and thus said sides are spread apart and the ends of the bar are freed from their engagement, and said bar and agitator are free to be removed from the casing. The elasticity of the casing will at all times keep the ends of the bar in place until the sides are forcibly compressed, as before described. The lower portion of the agitator being conformed to the sieve, no bearing other than said sieve is needed for this end of said agitator.

Having thus fully described my said invention, what I claim as new, and desire to secure by Letters Patent, is—

1. The combination, in a sifter, of the body or casing, the sieve, the agitator, and the cross-bar C, said cross-bar being formed of flat elastic metal and provided with shoulders or enlargements near each end, and a journal-bearing in the center, its ends mounted in mortise-like holes in the sides of said casing, and the agitator-shaft mounted in the journal-bearing in said cross-bar and provided with an enlargement just below it, said cross-bar thereby serving the double purpose of a support and an adjusting-spring for said agitator, substantially as set forth.

2. In a sifter, the combination of the body or casing A, composed of elastic material and provided with holes $a^2$ near its top, the hemispherical sieve B, near the bottom of said casing, the flat cross-bar C, formed from elastic metal and provided with enlargements $c$, near each end, and a journal-bearing in the center, and the agitator D, journaled in said journal-bearing and provided with an enlargement just below said cross-bar which comes in contact therewith when the parts are in position, substantially as set forth.

3. In combination with a sifter, an agitator consisting of a shaft and radial arms, said arms being secured to the end of said shaft by a +-shaped piece of thin metal, the arms of said piece of metal being bent up between said agitator-arms alongside said agitator-shaft and soldered thereto, substantially as set forth.

4. The combination, with the agitator of a sifter, of the +-shaped piece $d'$, one arm of which is turned up between each set of wires extending from the end of the agitator-shaft and secured to the sides of said shaft, thereby covering the point of intersection of said wires and securing them rigidly to the shaft, substantially as set forth.

In testimony whereof I have hereunto set my hand and seal, at Indianapolis, Indiana, this 10th day of October, A. D. 1884.

ANDREW L. HENRY. [L. S.]

In presence of—
C. BRADFORD,
E. W. BRADFORD.